No. 624,728. Patented May 9, 1899.
G. A. ANDERSON.
SPRING WHEEL.
(Application filed Sept. 28, 1898.)

(No Model.)

WITNESSES
Geo. H. Bliss Jr.
A. L. Donohoe

INVENTOR
Gustaf A. Anderson
by Herbert W. T. Jenner
Attorney

THE NORRIS PETERS CO., PHOTO-LITHO., WASHINGTON, D. C.

United States Patent Office.

GUSTAF ARVID ANDERSON, OF WAYNESBOROUGH, PENNSYLVANIA, ASSIGNOR TO THE GEISER MANUFACTURING COMPANY, OF SAME PLACE.

SPRING-WHEEL.

SPECIFICATION forming part of Letters Patent No. 624,728, dated May 9, 1899.

Application filed September 28, 1898. Serial No. 692,050. (No model.)

*To all whom it may concern:*

Be it known that I, GUSTAF ARVID ANDERSON, a citizen of the United States, residing at Waynesborough, in the county of Franklin and State of Pennsylvania, have invented certain new and useful Improvements in Spring-Wheels; and I do hereby declare the following to be a full, clear, and exact description of the invention, such as will enable others skilled in the art to which it appertains to make and use the same.

This invention relates to spring-wheels for traction-engines and other vehicles; and it consists in the novel construction and combination of the parts hereinafter fully described and claimed.

Figure 1:
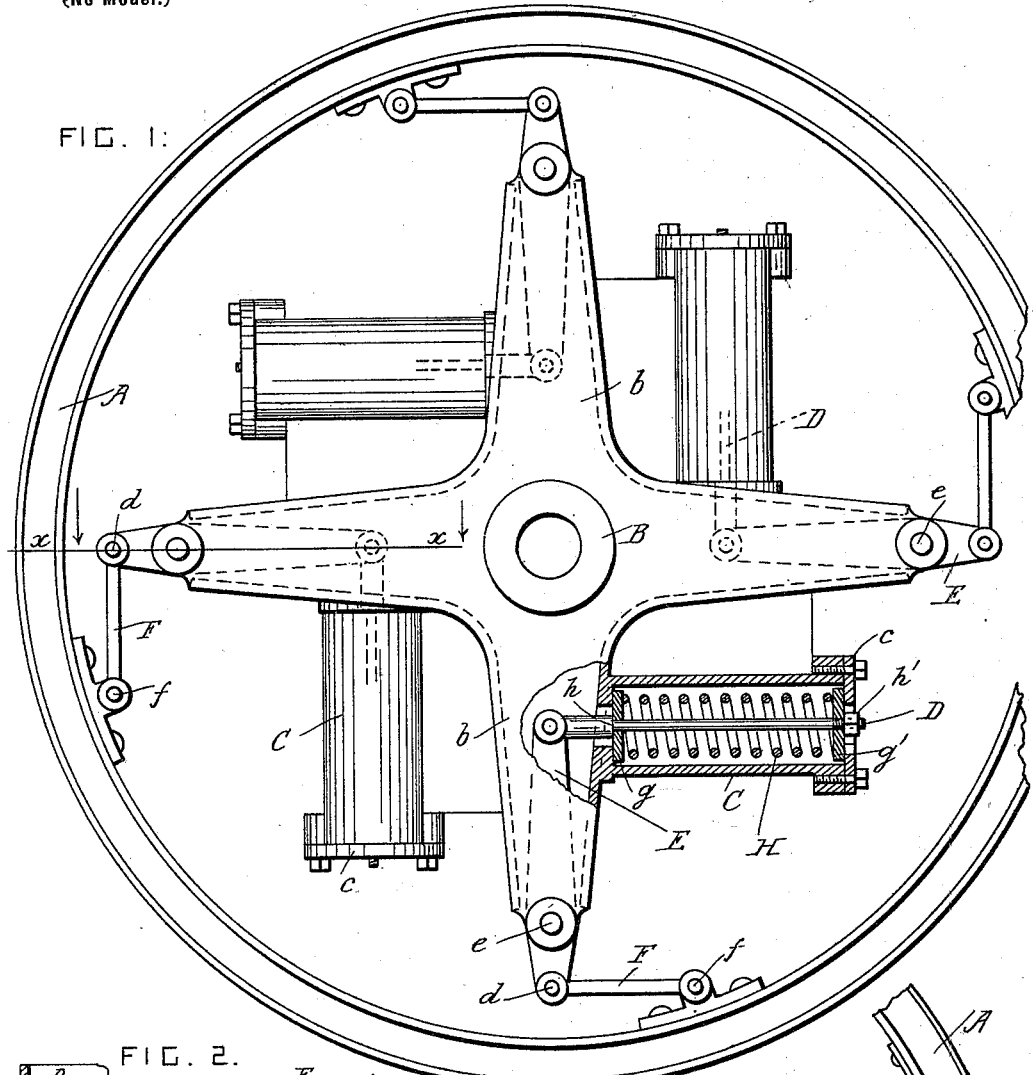
Figure 2:
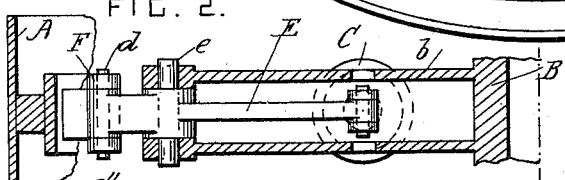
Figure 3:
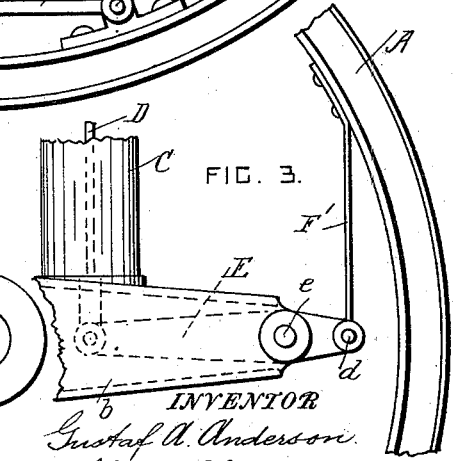
Figure 4:
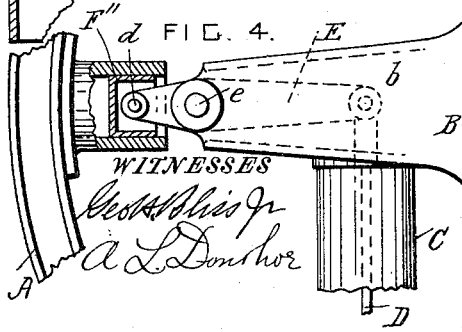

In the drawings, Figure 1 is a side view of a wheel, partly in section. Fig. 2 is a cross-section taken on the line $x\,x$ in Fig. 1. Fig. 3 is a side view of a portion of a wheel, showing a modification. Fig. 4 is a side view of a part of a wheel, showing a second modification.

A is the rim of the wheel, and B is the hub, which is mounted on a shaft in any approved manner. The hub is provided with a framework consisting of arms $b$, which carry frames or cylinders C, four cylinders being preferably used. These cylinders are arranged with their axes at an angle to the rim, and when four cylinders are used the axes of the cylinders on the opposite sides of the hub are substantially parallel to each other and substantially at right angles to the axes of the intervening or adjacent cylinders. These frames or cylinders are arranged between the hub and the outer or free end portions of the arms or framework and to one side of the said arms.

D are bolts which are arranged on the axes of the cylinders.

E are levers which are pivoted to the framework by pins $e$, arranged crosswise of the wheel, so that the levers rock in the plane in which the wheel revolves. The framework is preferably hollow, and the inner end portions of the levers extend within it and are operatively connected with the bolts D. The outer ends of the levers E are coupled to the wheel-rim by connections, which are pivoted to them by pins $d$. The pins $d$ permit the framework and the rim to have relative motion in the plane in which the wheel revolves, and the said connections prevent them from having relative motion laterally. These connections are preferably links F, which are pivoted to brackets secured to the rim by pins $f$.

Each bolt D has two plates $g$ and $g'$, which are normally slidable toward each other upon it. Each bolt is provided with a collar or shoulder $h$, which prevents the plate $g$ from moving too far away from the plate $g'$, and $h'$ is a nut on the end of the bolt, which prevents the plate $g'$ from moving too far away from the plate $g$. The plates $g$ and $g'$ normally abut against portions of the framework. The plate $g$ abuts against the bottom of the cylinder, and the plate $g'$ abuts against its cover-plate $c$, holes being provided in the said bottom and cover for the passage of the said bolt.

H is a helical spring, which is arranged in the cylinder C between the plates $g$ and $g'$, and this spring is preferably confined under a prearranged initial tension. The helical springs are always in compression irrespective of the direction of the motion of the wheel, and they transmit the driving strains and also support the constant load, according to their positions as the wheel revolves.

In the modification shown in Fig. 3 the connection between the lever and the rim is a spring-bar F', which is secured at one end to the rim and pivoted at its other end to the lever.

In the modification shown in Fig. 4 the connection between the lever and the rim is a plunger F'', which is slidable radially in a guide or pocket on or in the rim. The said plunger connection is pivoted to the lever by a pin $d$, the same as the spring-bar and the link connections hereinbefore described.

What I claim is—

1. In a spring-wheel, the combination, with a rim, and a framework provided with a hub; of a lever pivoted to the framework, a connection pivoted to the outer end portion of the said lever and operatively connected with the rim, and a spring connection carried by the said framework and operatively connected with the inner end portion of the said lever, substantially as set forth.

2. In a spring-wheel, the combination, with a rim, and a framework provided with a hub; of a lever pivoted to the framework, a link pivotally connected at each end with the outer end portion of the said lever and with the rim respectively, and a spring connection carried by the said framework and operatively connected with the inner end portion of the said lever, substantially as set forth.

3. In a spring-wheel, the combination, with a rim, and a framework provided with a hub; of levers normally arranged substantially radial to the axis of the wheel and pivoted to the said framework, connections arranged between the outer ends of the said levers and the rim, said connections permitting the framework and rim to have relative motion in the plane in which the wheel revolves and preventing them from having relative motion laterally, and spring connections carried by the said framework and operatively connected with the inner end portions of the said levers, substantially as set forth.

4. In a spring-wheel, the combination, with a rim, and a framework provided with a hub; of a lever pivoted to the framework, a connection pivoted to the outer end portion of the said lever and operatively connected with the rim, a bolt pivoted to the inner end portion of the said lever, plates normally slidable toward each other on the said bolt and bearing against portions of the said framework, and a helical spring arranged between the said plates, substantially as set forth.

5. In a spring-wheel, the combination, with a rim, and a framework comprising arms, a hub, and frames or cylinders arranged between the hub and the outer portions of the said arms and to one side of them; of levers pivoted to the outer portions of the said arms, connections pivoted to the outer end portions of the said levers and operatively connected with the rim, and spring connections carried by the said frames or cylinders and operatively connected with the inner end portions of the said levers, substantially as set forth.

In testimony whereof I affix my signature in presence of two witnesses.

GUSTAF ARVID ANDERSON.

Witnesses:
DANIEL S. BEARD,
J. STOVER PRICE.